Oct. 30, 1923.
H. M. BROWN
1,472,352
AUTOMOBILE WHEEL
Filed March 5, 1923
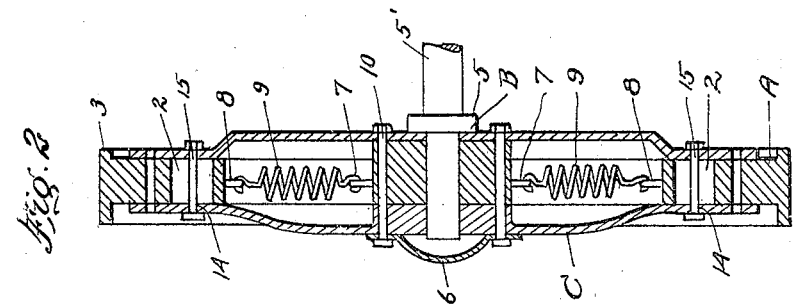
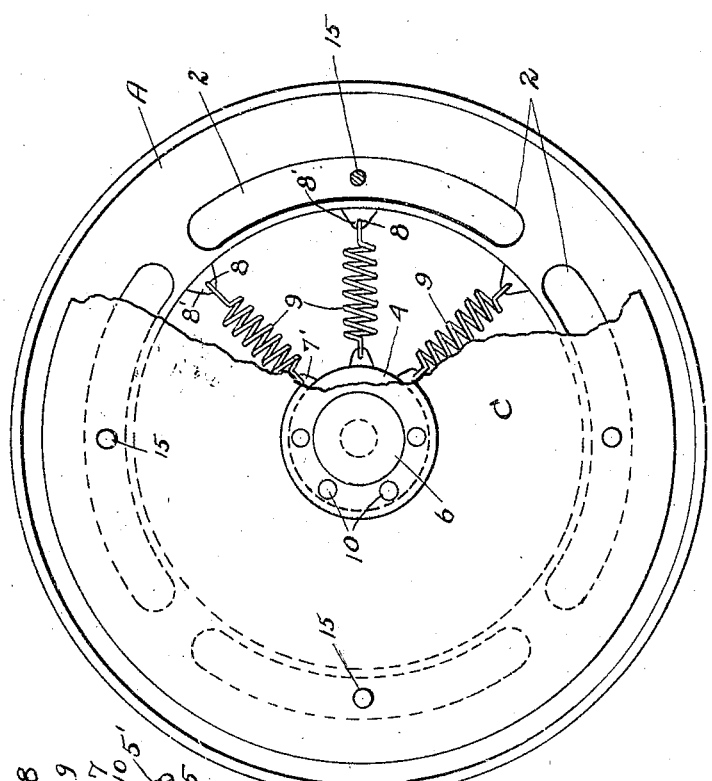
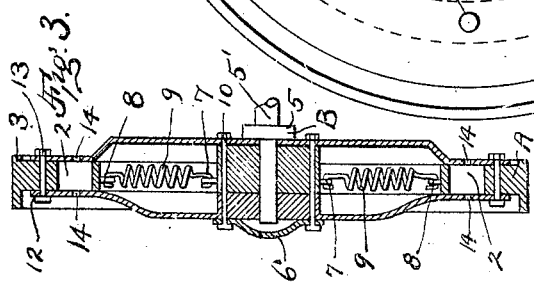
INVENTOR
Harry M. Brown
BY ATTORNEY
F. N. Gilbert Patented Oct. 30, 1923.

1,472,352

UNITED STATES PATENT OFFICE.

HARRY M. BROWN, OF UNION, NEW YORK.

AUTOMOBILE WHEEL.

Application filed March 5, 1923. Serial No. 623,030.

*To all whom it may concern:*

Be it known that I, HARRY M. BROWN, a citizen of the United States, residing at Union, in the county of Broome and State of New York, have invented certain new and useful Improvements in Automobile Wheels, of which the following is a specification.

My invention relates to improvements in automobile wheels and it has for its object to provide an automobile wheel in which the hub of the same is resiliently mounted and suspended within the same and adapted to present a strong but yielding support absorbing the shock of starting and stopping and a dependable support against rotating strain.

With these objects in view, my invention consists in certain novel features of construction and arrangements of parts as will hereinafter more clearly appear and be pointed out; reference being had to the accompanying drawings, in which:

Fig. 1 is a side view in cross section of my device.

Fig. 2 is an edge view partly in fragmentary form of my device.

Fig. 3 is an edge view in cross section of my device.

The same reference characters denote like parts in each of the several figures of the drawings.

In carrying out my invention, I provide the wheel felly A, which may be constructed of wood or any other desired and suitable material; said felly A, being slotted by the slots 2, 2, 2 let into the same and having also on its outer edge, the rim 3.

In the further construction of my device, in the interior open space within the felly A, I have suspended the hub B; the hub B has projected upon its outer surface, a ridge shoulder 4 and thru the hub extends the axle opening 5 and in which is mounted the axle 5′ and over the end of hub B is the cap 6; projected around the outer surface of the ridge shoulder 4, I have a lugs 7, having spaced openings therethru, 7′, 7′, 7′; also on the inner surface of the felly A, I have mounted upon or connected therewith, the projecting lugs 8, 8, 8. As a means of suspension and of mounting the hub B within the felly A, I have the coil springs 9, 9, 9, the outer ends of which pass thru or are linked into the openings 7′ and 8′ of the lugs 7 and the lugs 8 respectively. Mounted on the outer side of the felly A, I have an oval disc C which is supported and mounted upon the shoulder 4 of the hub B by means of the bolts 10, 10, 10, passing thru the bolt holes 10′, 10′, 10′ in shoulder 4 and also on the opposite side of ridge shoulder 4, I have mounted the disk D and supported and mounted on ridge shoulder 4 by means of said bolts 10, 10, 10, passing therethru and over end of hub B and mounted on disc C by means of bolts 10, 10, 10, I have cap 6: thus the discs C and D are firmly mounted and supported on the hub B and having resilient sliding contact with the outer surface of the felly A. Thru the felly A, I have also constructed the emergency bolt holes 11, 11, 11 and thru the discs C and D I have corresponding bolt holes 12, 12, 12 and thru which I can mount in case of emergency, thru excessive loading, the bolts 13, 13, 13. Mounted also in the discs C and D, I have the bolt holes 14, 14, 14, in which I mount the stud bolts 15, 15, 15 which pass thru the curved slots 2, 2, 2 in felly A, mounted between the discs and permitting a rotating resilient movement of the discs, guided by the stud bolts in the slots to a limited degree and thus covering the extent of and spacing limitation on the rotating movement of the hub B in felly A.

In the operation of my device, the hub B being mounted within the felly A, supported by the springs 9, 9 and the discs C and D, being firmly mounted upon the shoulder 4, they are free to rotate and to have a vertical movement or rotating movement, corresponding with the movement of the hub B. The bolts 15, 15, 15 connect between the discs and passing thru the slots 2, 2, 2, permit of a free rotating movement of the hub and the discs. If by any reason of an excessive load, the rotating movement of the hub or the pressure of the load brings the bolts 15, 15, 15 in contact with side or end of slots 2, 2, 2, they thereby become firm supports, sustaining the hub pressure within the felly. If it is desired by reason of an excessive load to give the hub B and axis, a rigid position within the felly A, I mount in the openings 11, 11, 11, the bolt, passing thru the felly A and the two parallel discs C and D; thus fastening the discs and the hub support firmly to the felly A. The openings 11, 11, 11 in the application of the bolts 13, 13, 13 therethru are emergency and supplemental strengthening features to give when needed necessary rigidity to the felly and wheel.

Having thus described my invention, what I claim as new and for which I desire Letters Patent, is as follows:

In an automobile wheel, a felly, having a laterally projecting rim; curved slotted openings in the felly; projecting lugs on the interior surface of the felly; a hub centrally mounted within the felly; a plurality of coil springs connecting with the outer surface of the hub and the interior lugs of the felly; means for mounting an axle within the hub; parallel discs removably mounted on the hub on each side of the felly, having sliding contact with the side surface of felly; removable means adapted to be mounted thru the discs and felly and making a rigid connection between the hub and felly.

In testimony whereof I have affixed my signature.

HARRY M. BROWN.